(12) United States Patent
Sato

(10) Patent No.: US 9,521,376 B2
(45) Date of Patent: Dec. 13, 2016

(54) ENDOSCOPE APPARATUS

(75) Inventor: Saichi Sato, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 1310 days.

(21) Appl. No.: 13/026,715

(22) Filed: Feb. 14, 2011

(65) Prior Publication Data

US 2011/0175990 A1 Jul. 21, 2011

Related U.S. Application Data

(63) Continuation of application No. PCT/JP2010/059667, filed on Jun. 8, 2010.

(30) Foreign Application Priority Data

Jan. 20, 2010 (JP) ................. 2010-010295

(51) Int. Cl.
*A62B 1/04* (2006.01)
*H04N 7/18* (2006.01)

(52) U.S. Cl.
CPC ..................... *H04N 7/183* (2013.01)

(58) Field of Classification Search
CPC ........................................... H04N 7/183
USPC ............................ 348/65–70; 600/160, 109
See application file for complete search history.

(56) References Cited

U.S. PATENT DOCUMENTS

| 6,707,029 | B1* | 3/2004 | Fuwa ................. 250/237 G |
| 7,239,128 | B2* | 7/2007 | Urisu ................. 324/760.01 |
| 7,969,006 | B2* | 6/2011 | Lin et al. ................. 257/758 |
| 2003/0160865 | A1* | 8/2003 | Takahashi ................. 348/65 |
| 2004/0225185 | A1 | 11/2004 | Obata et al. | |
| 2006/0015012 | A1* | 1/2006 | Sato ................. A61B 1/00006 600/118 |

FOREIGN PATENT DOCUMENTS

| JP | 2001-145099 | 5/2001 |
| JP | 2002-112960 A | 4/2002 |
| JP | 2002-233501 | 8/2002 |
| JP | 2004-135968 | 5/2004 |
| JP | 2008-093220 | 4/2008 |
| JP | 2008-104770 | 5/2008 |
| JP | 2009-006118 | 1/2009 |

\* cited by examiner

*Primary Examiner* — Nhon Diep
(74) *Attorney, Agent, or Firm* — Scully, Scott, Murphy & Presser, P.C.

(57) ABSTRACT

An endoscope apparatus is an endoscope apparatus that picks up an image of an object using a camera. The endoscope apparatus includes a semiconductor device mounted on a circuit substrate including a CPU core and a drive circuit for driving the camera and a parameter setting section provided in the semiconductor device that sets parameter data for adjusting output timing of a drive signal of the drive circuit or input timing of an image signal from the camera.

17 Claims, 8 Drawing Sheets

| SCOPE TYPE | ADJUSTMENT PARAMETER 1 | ADJUSTMENT PARAMETER 2 | ... |
|---|---|---|---|
| A0001 | ... | ... | |
| A0002 | ... | ... | |
| Z0001 | ... | ... | |
| B0100 | ... | ... | |
| ⋮ | | | |

| MONITOR TYPE | ADJUSTMENT PARAMETER 1 | ADJUSTMENT PARAMETER 2 | ... |
|---|---|---|---|
| GE101 | ... | ... | |
| SA2 | ... | ... | |
| TB01A | ... | ... | |
| SN100 | ... | ... | |
| ⋮ | | | |

| TOUCH PANEL TYPE | ADJUSTMENT PARAMETER 1 | ADJUSTMENT PARAMETER 2 | ... |
|---|---|---|---|
| TP01 | ... | ... | |
| TP02 | ... | ... | |
| TP02S | ... | ... | |
| WAA3 | ... | ... | |
| ⋮ | | | |

ENDOSCOPE APPARATUS

CROSS REFERENCE TO RELATED APPLICATION

This application is a continuation application of PCT/JP2010/059667 filed on Jun. 8, 2010 and claims benefit of Japanese Application No. 2010-010295 filed in Japan on Jan. 20, 2010, the entire contents of which are incorporated herein by this reference.

BACKGROUND OF INVENTION

1. Field of the Invention

The present invention relates to an endoscope apparatus.

2. Description of the Related Art

Endoscope apparatuses are widely used in an industrial field and a medical field. An endoscope apparatus includes an insertion portion provided with a camera at its distal end portion. A user can bring the camera provided at the distal end portion of the insertion portion closer to a vicinity of an object and cause an image picked up by the camera to be displayed on a monitor. For example, as proposed in Japanese Patent Application Laid-Open Publication No. 2001-145099, the endoscope apparatus includes a control section that controls various functions and a camera control unit that controls the camera. The endoscope apparatus can not only display an image of an object picked up by the camera provided at the distal end portion of the elongated insertion portion on the monitor but also store the image in a storage apparatus.

SUMMARY OF THE INVENTION

An aspect of the present invention is an endoscope apparatus that picks up an image of an object using an image pickup device, including a semiconductor device mounted on a circuit substrate and having a CPU and a first drive circuit for driving the image pickup device and a first parameter setting section provided in the semiconductor device that sets first parameter data for adjusting output timing of a drive signal of the first drive circuit or input timing of an image signal from the image pickup device.

DETAILED DESCRIPTION OF THE PREFERRED EMBODIMENT(S)

Hereinafter, an embodiment of the present invention will be described with reference to the accompanying drawings.

1. Overall Configuration

Figure 1:
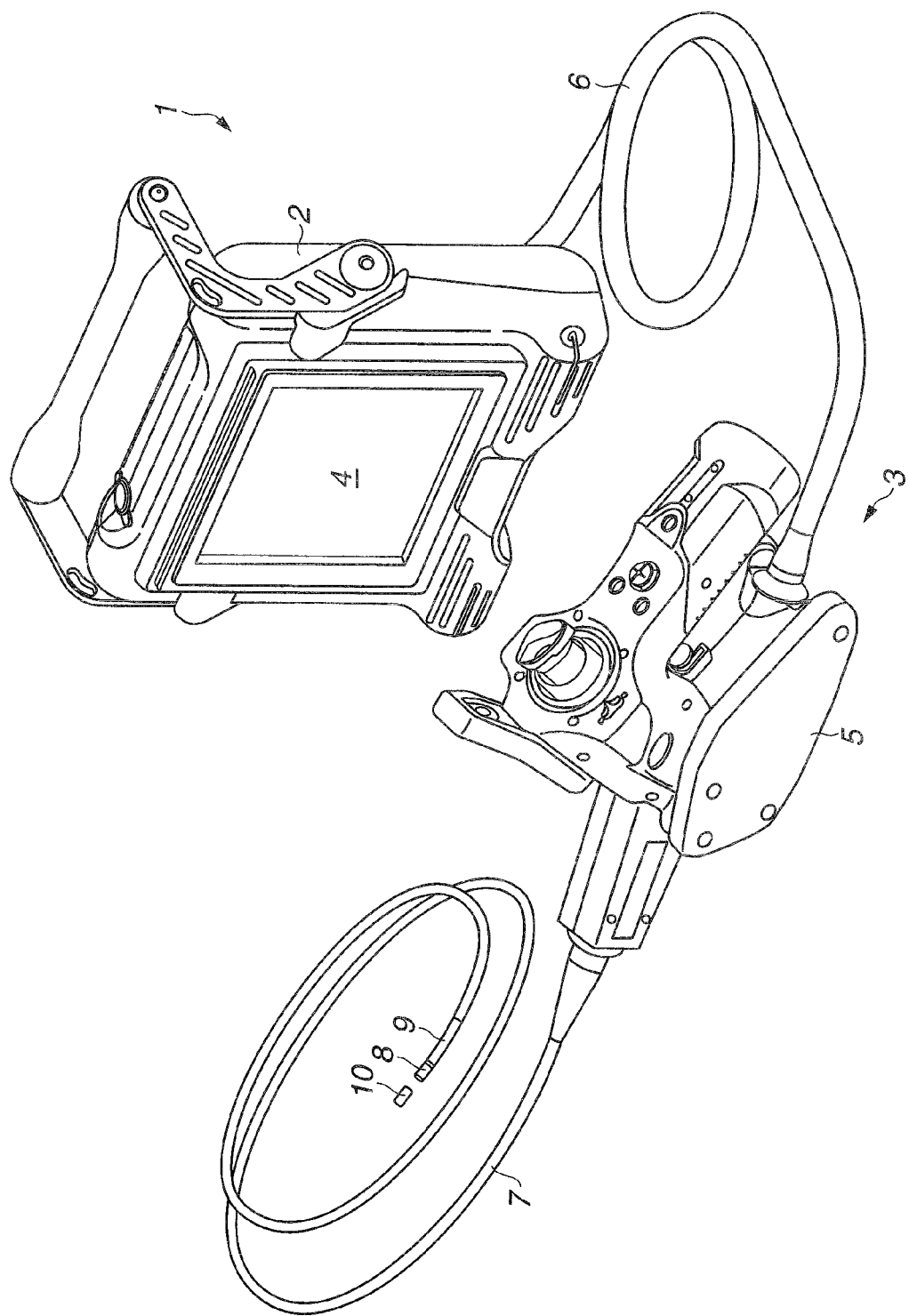
FIG. 1 is an outline configuration diagram of an endoscope apparatus according to an embodiment of the present invention.

First, a configuration of an endoscope apparatus according to the present embodiment will be described based on FIG. 1. FIG. 1 is an outline configuration diagram of an endoscope apparatus according to the present embodiment.

As shown in FIG. 1, an endoscope apparatus 1 is configured by including a main body 2 which is a main unit and a scope unit 3 connected to the main body 2. The main body 2 includes a liquid crystal panel (hereinafter abbreviated as "LCD") 4 as a display apparatus that displays an endoscope image, operation menu or the like. A touch panel (FIG. 2) is attached to the LCD 4 as will be described later. The scope unit 3 includes an operation section 5 and an insertion portion 7 made up of a flexible insertion tube, which is connected to the main body 2 via a universal cable 6 which is a connection cable. A distal end portion 8 of the insertion portion 7 incorporates an image pickup device (not shown), for example, CCD and an image pickup optical system such as lens is arranged on the image pickup surface side of the image pickup device. A bending portion 9 is provided on a proximal end side of the distal end portion 8. An optical adapter 10 can be attached to the distal end portion 8. The operation section 5 is provided with various operation buttons such as a release button and up/down/left/right (U/D/L/R) direction bending buttons.

The user can operate the various operation buttons of the operation section 5 to pick up an image of an object, record a still image or the like. The user can also operate a touch panel to instruct various operations of the endoscope apparatus 1. That is, the touch panel constitutes an instruction section for instructing operation contents of the endoscope apparatus 1.

Image data obtained by image pickup is inspection data of the inspection target, recorded in a recording medium such as a memory card and the memory card (FIG. 2) is detachable from the main body 2.

The scope unit 3 is detachable from the main body 2. Furthermore, the LCD 4 and the touch panel attached to the LCD 4 are also detachable from the main body 2. Thus, the scope unit 3 is replaceable according to the type of product or purpose of use during manufacture or use. The length or the like of the insertion portion 7 of the scope unit 3 varies depending on the type thereof. Furthermore, the LCD 4 and the touch panel are attached to the main body 2 according to the type of product during manufacture. The lengths or the like of cables of connection of the LCD 4 and the touch panel with a circuit substrate (FIG. 2) of the main body 2 also vary depending on their types respectively.

The scope unit 3, the LCD 4 and the touch panel are each provided with an identification section to identify their respective types when connected to the main body 2 as will be described later. The main body 2 is configured, when the scope unit 3, the LCD 4 and the touch panel are connected thereto, so as to detect or read the states of the respective identification sections or identification data (that is, ID data) to identify the respective types. Here, the ID includes not only information on the type such as the model of the apparatus but also unique information such as manufacturing number for individual identification.

2. Circuit Configuration

Figure 2:
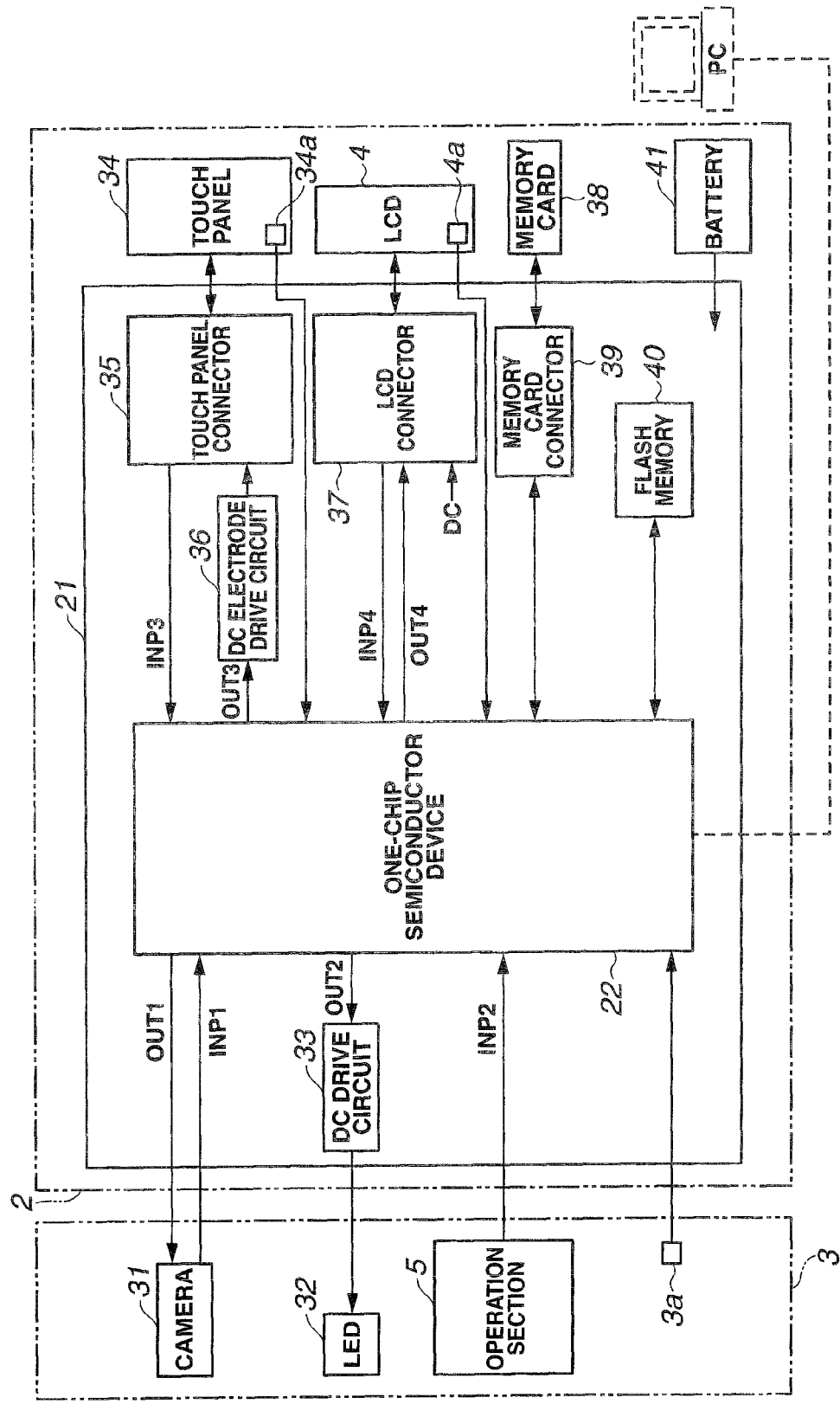
FIG. 2 is a block diagram illustrating an inner circuit configuration of a main body 2 of an endoscope apparatus 1 according to the embodiment of the present invention.
Figure 3:
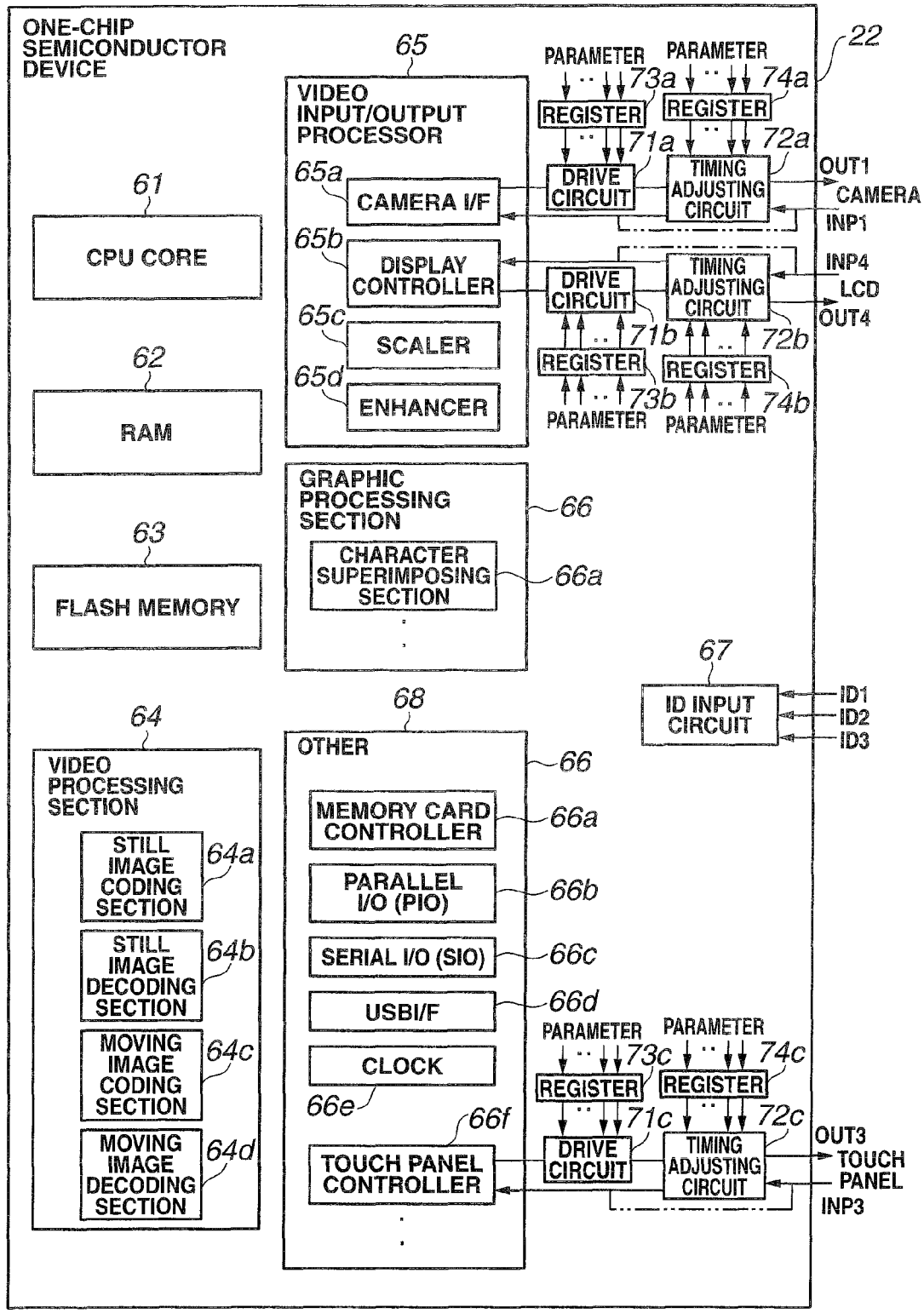
FIG. 3 is a block diagram illustrating an internal configuration of a semiconductor device 22 according to the embodiment of the present invention.

FIG. 2 is a block diagram illustrating an inner circuit configuration of the main body 2 of the endoscope apparatus 1. FIG. 3 is a block diagram illustrating an internal configuration of the semiconductor device 22.

Inside the main body 2, the semiconductor device 22 incorporating various functions which will be described later is mounted on a circuit substrate 21. The semiconductor device 22 is a one-chip semiconductor device. The semiconductor device 22 is a one-chip IC having functions of a camera control unit and a control section.

The semiconductor device 22 is connected to apparatuses such as the camera and the LCD via a drive circuit or connector. The semiconductor device 22 is electrically connected to apparatuses such as the camera via wiring on the one circuit substrate 21 and a signal cable connected to the wiring.

A camera 31 is provided in the distal end portion 8 of the insertion portion 7 and is connected to the semiconductor device 22. The semiconductor device 22 outputs various drive signals OUT1 to the camera 31 and the camera 31 outputs various input signals INP1 such as video signal to the semiconductor device 22. The camera 31 is a CMOS sensor here.

Therefore, the semiconductor device 22 is electrically connected to the camera 31 in the insertion portion 7 via a signal line and incorporates a drive circuit so as to directly supply a drive signal to the camera 31 and has an image pickup signal directly inputted from the camera including the CMOS sensor.

An LED 32 is provided in the distal end portion 8 of the insertion portion 7 as an illumination section that illuminates an object to be observed and connected via a DC drive circuit 33. The semiconductor device 22 outputs a drive signal OUT2 for the LED 32 to the DC drive circuit 33 and the LED 32 is driven by the output of the DC drive circuit 33. The DC drive circuit 33 is mounted on the circuit substrate 21.

The operation section 5 is connected to the semiconductor device 22. The operation section 5 outputs an input signals INP2 which are various operation signals indicating operation contents for the operation section 5 to the semiconductor device 22.

A touch panel 34 is arranged on and attached to the surface of an LCD 4 and connected to the semiconductor device 22 via a touch panel connector 35 and a DC electrode drive circuit 36. The semiconductor device 22 outputs a drive signal OUT3 to drive each electrode of the touch panel 34 to the DC electrode drive circuit 36 and the touch panel 34 is driven by the output of the DC electrode drive circuit 36 via the touch panel connector 35. The touch panel connector 35 and the DC electrode drive circuit 36 are mounted on the circuit substrate 21. The DC electrode drive circuit 36 is a circuit that converts the drive signal OUT3 from the semiconductor device 22 to a voltage signal that can drive each electrode of the touch panel 34.

An input signal INP3 which is a detection signal of a touch position from the touch panel 34 is outputted to the semiconductor device 22 via the touch panel connector 35.

Therefore, the semiconductor device 22 is electrically connected to the touch panel 34 via a signal line and includes a drive circuit so as to supply a drive signal to the touch panel 34 and directly inputs an input signal from the touch panel 34.

The LCD 4 is connected to the semiconductor device 22 via an LCD connector 37. A backlight DC power supply is given to the LCD connector 37. The LCD connector 37 is mounted on the circuit substrate 21. The semiconductor device 22 communicates various command signals with the LCD 4, inputs an input signal INP4 from the LCD 4 and outputs various drive signals OUT4 to the LCD 4.

Therefore, the semiconductor device 22 is electrically connected to the LCD 4 via a signal line and includes a drive circuit so as to directly supply a drive signal to the LCD 4.

A memory card 38 is a storage medium for recording an endoscope image and is connected to the semiconductor device 22 via a memory card connector 39. The memory card connector 39 is mounted on the circuit substrate 21.

The circuit substrate 21 is mounted with a flash memory 40 and the flash memory 40 is connected to the semiconductor device 22. The flash memory 40 may be omitted when a flash memory 63 (FIG. 3) incorporated in the semiconductor device 22 which will be described later provides a sufficient amount of storage necessary for various kinds of processing.

A battery 41 supplies power to one, or two or more DC/DC circuits (not shown) on the circuit substrate 21 and each DC/DC circuit supplies power necessary for each circuit on the circuit substrate 21.

In the aforementioned example, the touch panel connector 35, the LCD connector 37 and the memory card connector 39 are provided on the circuit substrate 21, but these connectors may not necessarily be placed on the circuit substrate 21.

The scope unit 3 detachable from the main body 12, the LCD 4 and the touch panel 34 include identification sections 3a, 4a and 34a for identifying their respective types as described above. Each identification section includes a resistor and a memory which stores ID data or the like. When the scope unit 3, the LCD 4 and the touch panel 34 are connected to the main body 2 or circuit substrate 21, the semiconductor device 22 detects a resistance value of the identification section of each connected apparatus or reads ID data, and can thereby identify the type of the connected apparatus.

Here, among the aforementioned input signals and output signals, examples of those associated with adjustment parameters will be described. An adjustment parameter is setting data about an apparatus connected or circuit and device or the like included in the apparatus.

When the camera 31 is a CCD image pickup device, video signal adjustment parameters related to the drive signal OUT1 are, for example, timing of horizontal synchronization signal (Hsync) and vertical synchronization signal (Vsync) which are reference signals of timing of the drive signal OUT1, output timings and voltages of horizontal transfer pulse, vertical transfer pulse, reset pulse outputted to the CCD image pickup device and subpulse (SUB) used for an electronic shutter. Examples of video signal adjustment parameters related to the input signal INP1 include timings and voltages of sample-and-hold pulse of CDS (correlation double sampling), sampling clock of A/D, optical black pulse and pre-blanking pulse.

Furthermore, when the camera is a CMOS image pickup device, examples of adjustment parameters related to the drive signal OUT1 include output timing of a CMOS operation clock. Examples of adjustment parameters related to the input INP1 include input timings and voltages of pixel clock (PxClk), horizontal synchronization signal, vertical synchronization signal, signal for adjusting timing by one bit at a time for an eight-bit digital video signal in a video input format, horizontal valid image data signal (V offset) and vertical valid image data signal (H offset).

Examples of adjustment parameters related to the LCD 4 include input/output timings and voltages of horizontal synchronization signal, vertical synchronization signal, video data enable signal, LCD drive clock signal and signal for adjusting timing by one bit at a time for RGB 24-bit signal.

Examples of adjustment parameters related to the touch panel 34 include input/output timings and voltages of electrode drive signal, touch position detection signal (e.g., touch panel electrode signal or pen-down signal).

Next, contents of the semiconductor device 22 will be described using FIG. 3.

The semiconductor device 22 is a one-chip IC as described above. The semiconductor device 22 incorporates a CPU core 61 which is a core section of a central processing unit (CPU), a RAM 62, a flash memory 63 as a nonvolatile rewritable memory, a video processing section 64, a video input/output processor 65, a graphic processing section 66, an ID input circuit 67 and other circuits 68. The CPU core 61 is connected to each circuit section via an internal bus or signal line group and the circuit sections are also connected to each other via the internal bus or signal line group. As described above, the semiconductor device 22 controls the entire endoscope apparatus 1 and also has a function of a conventional camera control unit. As will be described later, since the semiconductor device 22 incorporates a drive circuit and a timing adjusting circuit of each apparatus, the semiconductor device 22 incorporating a drive circuit and a timing adjusting circuit of each apparatus is also preferable from die standpoint of EMC measures.

The CPU core 61 is a control section that performs processing such as various calculations and executes operation of each function of the endoscope apparatus 1. The RAM 62 is a memory for a work storage area of the CPU core 61. The flash memory 63 stores various programs including a program for setting various adjustment parameters in each drive circuit and each timing adjusting circuit, which will be described later, and various parameter data beforehand. The program for setting adjustment parameters functions as a parameter setting section that sets various adjustment parameters. The CPU core 61 reads the processing program or the like from the flash memory 63, expands and executes the processing program on the RAM 62.

The RAM 62 may also be located outside the semiconductor device 22. The video processing section 64 is a circuit that processes moving images and still images picked up by the camera 31 and includes a still image coding section 64a, a still image decoding section 64b, a moving image coding section 64c and a moving image decoding section 64d. The video processing section 64 encodes image data of an inputted still image in a JPEG format or the like and a moving image in an MPEG4 format or the like and decodes image data stored in the memory card 38. The coded data is stored in the memory card 38 and the decoded data is outputted to the LCD 4 and images are displayed on a screen.

The video input/output processor 65 is a processor that controls input/output of video data to/from the camera 31 and the LCD 4 and includes a camera I/F 65a, a display controller 65b, a scaler 65c and an enhancer 65d or the like.

The camera I/F 65a drives the camera 31 via a drive circuit 71a and a timing adjusting circuit 72a for the camera 31 and receives an image pickup signal via the timing adjusting circuit 72a.

When the image pickup signal from the camera 31 is an analog signal, an A/D converter that receives the image pickup signal is included in the timing adjusting circuit 72a.

Data of a plurality of adjustment parameters set in a register 73a is supplied, that is, transmitted to the drive circuit 71a. The drive circuit 71a is a circuit to drive the camera 31 that outputs the drive signal OUT1 of a voltage corresponding to the supplied adjustment parameter data.

Data of a plurality of adjustment parameters set in a register 74a is supplied, that is, transmitted to the timing adjusting circuit 72a.

The timing adjusting circuit 72a is an adjusting circuit provided in the semiconductor device 22 that adjusts output timing of a drive signal of the drive circuit 71a and adjusts input timing of an input signal from the camera 31, and when the program as the parameter setting section sets data of adjustment parameters in the timing adjusting circuit 72a, as will be described later, timings of input/output signals are adjusted according to the set data of adjustment parameters. The timing adjusting circuit 72a adjusts timing of a reference signal of various drive signals OUT1 at timing corresponding to the supplied adjustment parameter, outputs the various drive signals OUT1 at timing corresponding to the supplied adjustment parameter data and receives an input signal INP1 at timing corresponding to the supplied adjustment parameter data.

The drive circuit 71a and the timing adjusting circuit 72a adjust the gain of an amplifier, adjust the amount of delay of a delay circuit and adjust the pulse width and the duty ratio of pulses according to the bit value corresponding to the adjustment parameter data inputted from the registers 73a and 74a respectively.

The display controller 65b drives a drive circuit 71b for the LCD 4 and outputs display data to the LCD 4 via a timing adjusting circuit 72b. Data of a plurality of adjustment parameters set in a register 73b is supplied to the drive circuit 71b. The drive circuit 71b is a circuit to drive the LCD 4 as a display section that displays an image of an object picked up by the camera 31 and the drive circuit 71b outputs a drive signal OUT4 of a voltage corresponding to the supplied adjustment parameter data.

Data of a plurality of adjustment parameters set in a register 74b is supplied to the timing adjusting circuit 72b. As in the case of the timing adjusting circuit 71a, the timing adjusting circuit 72b outputs various drive signals OUT4 at timing corresponding to the supplied adjustment parameter data and receives an input signal INP4 at timing corresponding to the supplied adjustment parameter data.

The graphic processing section 66 includes a character superimposing section 66a.

The ID input circuit 67 is a circuit that inputs identification signals (voltages or data) from the respective identification sections 3a, 4a and 34a of the scope unit 3, the LCD 4 and the touch panel 34, generates data corresponding to the inputted identification signals and outputs the data to the CPU core 61.

The other circuits 68 include a memory card controller 66a, a parallel I/O 66b, a serial I/O 66c, a USB I/F 66d, a clock 66e and a touch panel controller 66f or the like.

The memory card controller 66a is a circuit that controls data input/output to/from the memory card 38.

The parallel I/O (PIO) 66b is an interface circuit to input an operation button signal from the operation section 5 and input/output a parallel signal (not shown) and the serial I/O (SIO) 66c is an interface circuit to input/output a serial signal (not shown). The USB I/F 66d is an interface circuit to input/output data to/from a USB standard apparatus. The clock 66e is a circuit for internal time management.

The touch panel controller 66f outputs a drive signal OUT3 to the touch panel 34 via a drive circuit 71c and a timing adjusting circuit 72c for the touch panel 34 and inputs an input signal INP3 via the timing adjusting circuit 72c. Data of a plurality of adjustment parameters set in a register 73c is supplied to the drive circuit 71c. The drive circuit 71c is a circuit that drives an instruction section that instructs operation contents of the endoscope apparatus 1 and outputs the drive signal OUT3 of the voltage corresponding to the supplied adjustment parameter data.

Data of a plurality of adjustment parameters set in a register 74c is supplied to the timing adjusting circuit 72c. As in the case of the timing adjusting circuit 71a, the timing adjusting circuit 72c outputs various drive signals OUT3 at timing corresponding to the supplied adjustment parameter data and receives au input signal INP3 at timing corresponding to the supplied adjustment parameter data.

As shown above, the aforementioned registers 73a, 73b, 73c, 74a, 74b and 74c are one, or two or more registers that can store one, or two or more pieces of adjustment parameter data. FIG. 3 illustrates registers such that one register is provided for each drive circuit and further one register is provided for each timing adjusting circuit, but a register is provided for each adjustment parameter. A plurality of adjustment parameters may also be stored in one register.

There may be a case where timing adjustment is not necessary for each input signal INP. In such a case, as shown by two-dot dashed lines in FIG. 3, an input signal may be inputted to the video input processor 65 or the other circuits 68 without going through the timing adjusting circuit.

Furthermore, when data transmission/reception between the camera 31, the LCD 4 or touch panel 34 and the semiconductor device 22 is carried out through serial communication using an LVDS or the like, the circuit such as the LVDS is provided between each timing adjusting circuit 72 and the camera 31, LCD 4 or touch panel 34.

Furthermore, when the illumination LED 32 is PWM-driven, the PWM drive I/F is included in the other circuits 68 and the semiconductor device 22 directly PWM-drives the LED 32 or drives the LED 32 via a separately provided drive circuit.

3. Initial values of adjustment parameters and their settings

Figure 4:
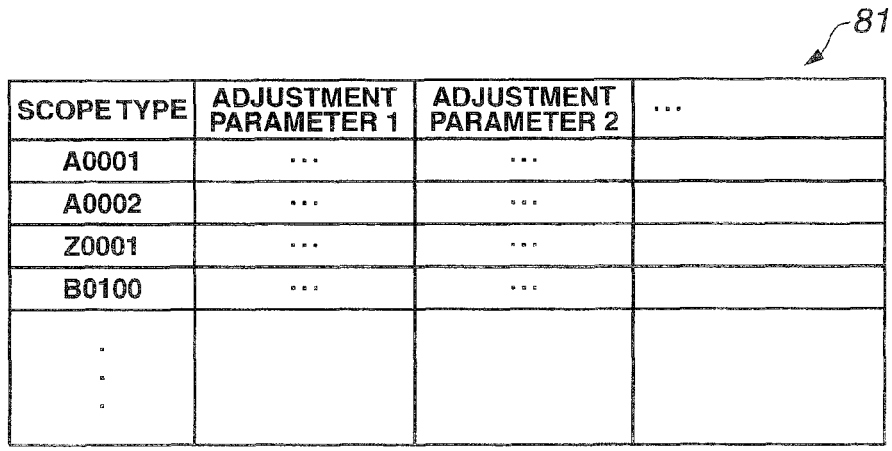
FIG. 4 is a diagram illustrating examples of table data which stores adjustment parameters associated with a camera corresponding to the type of a scope unit 3 according to the embodiment of the present invention.

Each adjustment parameter is set according to the type of an apparatus connected as an initial set value. FIG. 4 is a diagram illustrating an example of table data which stores adjustment parameters related to a camera corresponding to the type of the scope unit 3. The table data in FIGS. 4 to 6 which will be described below is stored in the flash memory 63 (or 40).

Table data 81 in FIG. 4 stores various adjustment parameters about the scope unit in a table data format for each scope type indicating the type of the scope unit 3. As will be described later, the CPU core 61 reads each adjustment parameter corresponding to an ID of a connected apparatus (that is, the scope unit) from the flash memory 63 and sets the adjustment parameter in a corresponding register. ID1 of the scope unit 3 is determined by the CPU core 61 based on an identification signal (voltage or data) from the identification section 3a inputted via the ID input circuit 67.

Each adjustment parameter stored in the table data 81 is a parameter value for causing each apparatus to operate appropriately according to the length or the like of the insertion portion 7 that differs from one apparatus to another (that is, from one scope unit to another) and contents of EMC measures. An adjustment parameter value obtained as a result of, for example, actually connecting and adjusting each apparatus is used as each parameter value.

An adjustment parameter 1 is an output voltage value of a horizontal transfer pulse and an adjustment parameter 2 is an output timing value of a horizontal transfer pulse. The apparatus of that ID is connected to the main body 2, the output voltage value and output timing of the horizontal transfer pulse are adjusted and the values obtained by the adjustment are stored in the table data 81 as the adjustment parameters 1 and 2.

The output voltage value of the adjustment parameter 1 is stored in the register 73a and outputted to the drive circuit 71a. The output timing value of the adjustment parameter 2 is stored in the register 74a and outputted to the timing adjusting circuit 72a.

The drive circuit 71a includes a voltage adjusting circuit that adjusts and outputs an output voltage according to an inputted value of the adjustment parameter 1. Thus, the drive circuit 71a can adjust and output an output voltage of a horizontal transfer pulse according to the value of the adjustment parameter 1. The drive circuit 71a adjusts the gain or the like of the amplifier according to a bit value corresponding to the adjustment parameter data inputted from the register 73a.

The timing adjusting circuit 72a includes a circuit that adjusts the output timing of the horizontal transfer pulse according to an inputted value of the adjustment parameter 2. Thus, the timing adjusting circuit 72a can adjust and output the output timing of the horizontal transfer pulse according to the value of the adjustment parameter 2. The timing adjusting circuit 72a adjusts the amount of delay of the delay circuit and adjusts the pulse width and the duty ratio of the pulse or the like according to the bit value corresponding to the adjustment parameter data inputted from the register 74a.

Likewise, other adjustment parameters are also stored as adjustment parameter 3, adjustment parameter 4 or the like in the register 73a or 74a and supplied to the drive circuit 71a or timing adjusting circuit 72a. The drive circuit 71a and the timing adjusting circuit 72a then adjust the voltage and output timing of the drive signal OUT1 according to a given adjustment parameter and output the voltage and output timing to the camera 31, respectively.

The camera 31 can output various drive signals OUT I at an appropriate voltage and output timing according to the type of the scope unit 3 and input the various input signals INP1 at appropriate input timing.

The insertion portion 7 in particular varies in length depending on the type of the scope unit 3 and its EMC measures are also different from those of the other scope units. Thus, a plurality of appropriate adjustment parameters are set in the registers 73a and 74a according to the type of the scope unit 3, an appropriate drive signal OUT1 is outputted and an appropriate input signal INP1 is inputted, and therefore the camera 31 operates appropriately.

Figure 5:
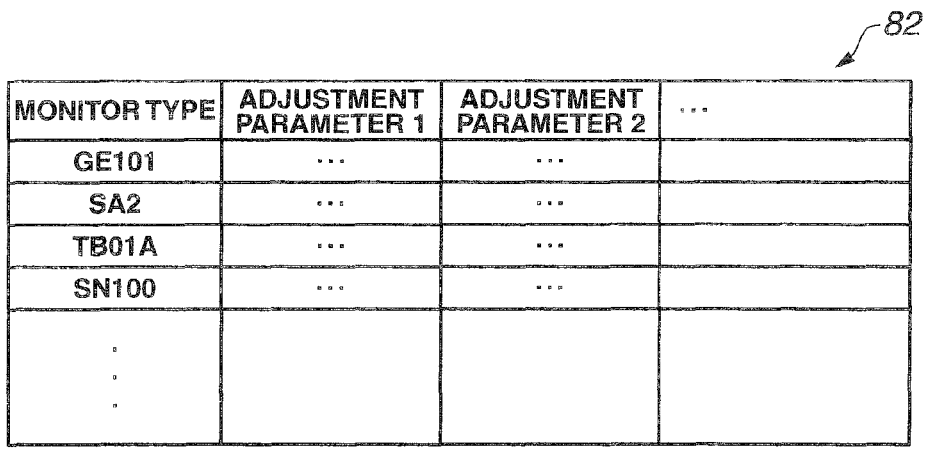
FIG. 5 is a diagram illustrating examples of table data which stores adjustment parameters associated with a monitor corresponding to the type of the monitor according to the embodiment of the present invention.

FIG. 5 is a diagram illustrating an example of table data which stores adjustment parameters related to a monitor according to the type of the monitor.

Table data 82 in FIG. 5 stores various adjustment parameters related to the monitor in a table data format for each monitor type indicating the type of the LCD 4. The CPU core 61 reads each adjustment parameter corresponding to ID2 of a connected apparatus (that is, the monitor) from the flash memory 63 and sets the adjustment parameter in a predetermined storage region of a corresponding register. The ID of the LCD 4 is determined by the CPU core 61 based on an identification signal (voltage or data) from the identification section 4a inputted via the ID input circuit 67.

Each Adjustment parameter stored in the table data 82 has a parameter value for each apparatus to operate appropriately according to the wiring length between the LCD 4 and the circuit substrate 21 that varies from one apparatus to another (that is, from one monitor to another) and contents of EMC measures. An adjustment parameter obtained as a result of, for example, actually connecting and adjusting each apparatus is used as each parameter value.

Figure 6:
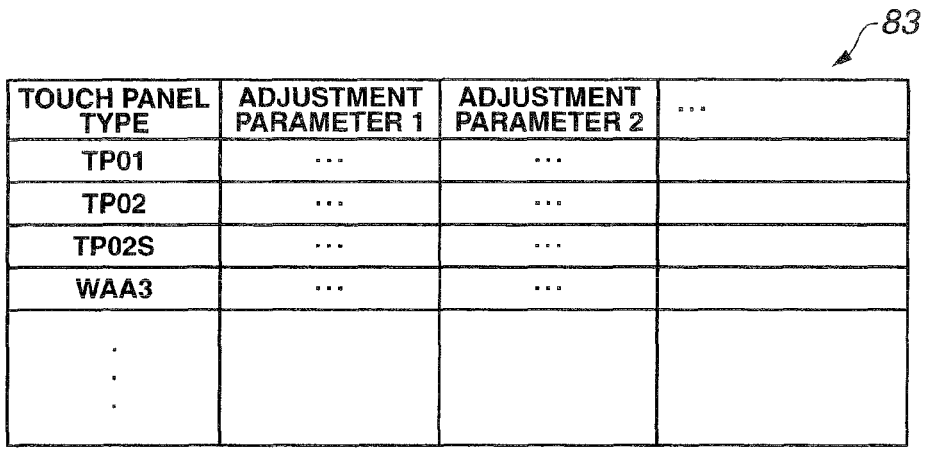
FIG. 6 is a diagram illustrating examples of table data which stores adjustment parameters associated with a touch panel corresponding to the type of the touch panel according to the embodiment of the present invention.

Likewise, FIG. 6 is a diagram illustrating an example of table data which stores adjustment parameters related to a touch panel corresponding to the type of the touch panel.

Table data 83 in FIG. 6 stores various adjustment parameters related to the touch panel in a table data format for each type of the touch panel 34. The CPU core 61 reads each adjustment parameter corresponding to ID3 of a connected apparatus (that is, the touch panel) from the flash memory 63 and sets the adjustment parameter in a predetermined storage region of a corresponding register. The ID of the touch panel 34 is determined by the CPU core 61 based on an identification signal (voltage or data) from the identification section 34a inputted via the ID input circuit 67.

Each Adjustment parameter stored in the table data 83 has a parameter Value for each apparatus to operate appropriately according to the wiring length between the LCD 4 and the circuit substrate 21 that varies from one apparatus to another (that is, from one touch panel to another) and contents of EMC measures. An adjustment parameter obtained as a result of for example, actually connecting and adjusting each apparatus is used as each parameter value.

The CPU core 61 in the present embodiment obtains ID of each apparatus by reading data or a signal of the identification section provided for each apparatus, but if the touch panel 34 is available, the IDs of the scope unit 3 and the LCD 4 may be inputted from the touch panel 34.

4. Adjustment Parameter Setting Processing

Next, the setting processing for each of the aforementioned adjustment parameters will be described.

4.1 Parameter Setting During Manufacture

Figure 7:
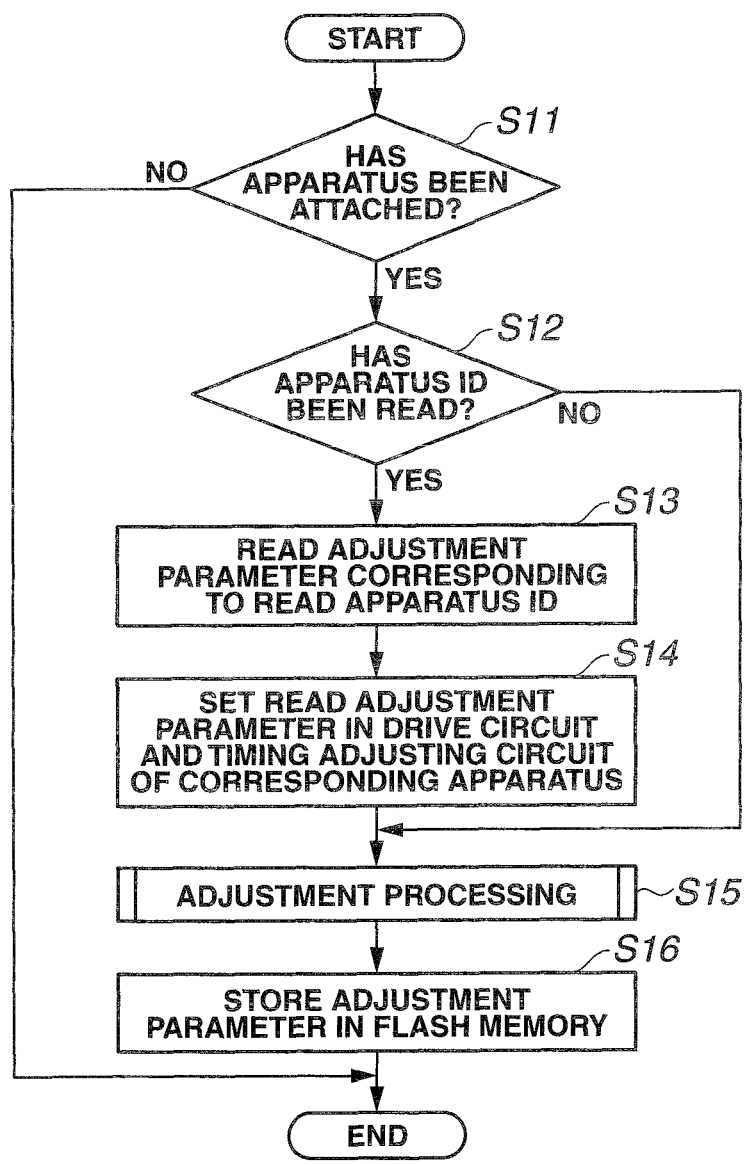
FIG. 7 is a flowchart illustrating a flow example of adjustment parameter setting processing during manufacture of the endoscope apparatus 1 according to the embodiment of the present invention.

FIG. 7 is a flowchart illustrating a flow example of adjustment parameter setting processing during manufacture of the endoscope apparatus 1. The LCD 4, the scope unit 3 and the touch panel 34 are connected or attached to the main body 12 in that order and the processing in FIG. 7 is executed for each connected apparatus.

An adjuster of the manufacturing line performs setup so as to set each adjustment parameter using a screen of an apparatus such as a personal computer (PC) connected via the parallel I/O 66b or serial I/O 66c of the main body 2. The apparatus such as a PC is shown by a dotted line in FIG. 2.

When the power to the main body 12 is turned on and the user selects the adjustment parameter setting processing, the CPU core 61 reads an adjustment parameter setting processing program from the flash memory 63 and executes the program.

First, the CPU core 61 determines whether or not the apparatus (first, the LCD 4) is connected or attached (step S11). The determination on whether or not the apparatus is connected is made by, for example, detecting the presence/absence of continuity of a current on a connection detection signal line provided on the connector section.

When the apparatus is connected, step S11 results in "YES" and the CPU core 61 determines whether or not the ID of the connected apparatus has been read (step S12).

When the ID of the apparatus has been read, step S12 results in "YES" and the CPU core 61 reads an adjustment parameter corresponding to the read apparatus ID (step S13). First, the type of the monitor is determined based on the information on the apparatus ID2. Various adjustment parameters corresponding to the type of the monitor are read from the table data 82 in FIG. 5 stored in the flash memory 63 and written to the RAM 62. The data of the apparatus ID read in step S12 is also written to the RAM 62.

The CPU core 61 then writes, that is, stores the various read adjustment parameters in the corresponding registers 73b and 74b in which the respective parameters are to be set, and thereby sets the adjustment parameters in the drive circuit 71b and timing adjusting circuit 72b (step S14). The processing in step S14 constitutes a parameter setting section provided in the semiconductor device 22 that sets parameter data for adjusting at least one of output timing of a drive signal or input timing of an input signal of the drive circuit 71b.

Various adjustment parameters are set in the drive circuit 71b and the timing adjusting circuit 72b, and the output voltage and the output timing of an output signal, and the input timing of an input signal are thereby adjusted according to each set adjustment parameter and a predetermined image is displayed on the screen of the LCD 4. If the displayed image is appropriate, the adjustment parameters are correctly set and the adjusts processing (step S15) is thereby skipped and the CPU core 61 stores the adjustment parameters written in the RAM 62 in the flash memory 63 together with an apparatus ID (here, ID2 of the LCD 4).

Instructions on the skip in step S15 and the storage processing in step S16 are given by, for example, an adjuster or inspector of the manufacturing line observing the screen of the LCD 4, performing a predetermined operation on the PC and giving a predetermined instruction to the CPU core 61.

In step S14, various adjustment parameters are set in the drive circuit 71b and the timing adjusting circuit 72b, but when a predetermined image is not appropriately displayed on the screen of the LCD 4, the adjustment processing in step S15 is performed by the adjuster. This adjustment processing is performed by the adjuster using a tester or the like.

Figure 8:
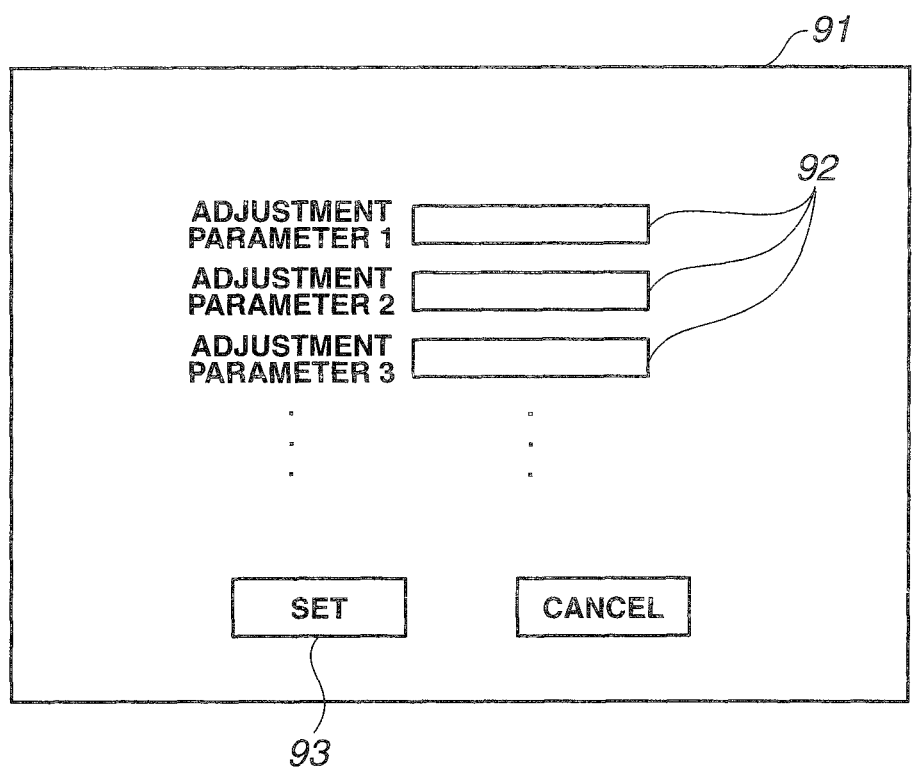
FIG. 8 is a diagram illustrating an example of adjustment parameter setting screen according to the embodiment of the present invention.

The adjuster stores the various adjustment parameters set in the adjustment processing (step S 15) in the RAM 62 using a PC or the like connected to the main body 2. The PC or the like is configured so that an adjustment parameter setting screen as shown in FIG. 8 is displayed on the screen of the monitor of the PC or the like. FIG. 8 is a diagram illustrating an example of adjustment parameter setting screen. The adjuster who is the user can input an adjustment parameter in an input field 92 corresponding to each adjustment parameter displayed on a screen 91. Adjustment parameters can be stored by clicking on a set button 93 or the like.

When the apparatus (that is, LCD 4) is not connected, step S11 results in "NO" and processing on the LCD 4 is not performed.

Furthermore, when the apparatus ID cannot be read (when the identification section is abnormal or malfunctions or no identification section is provided or the like), step S12 results in "NO" and the inspector performs adjustment processing (step S15).

As described above, the apparatus ID includes not only information on the type such as the model of the apparatus but also unique information such as manufacturing number for individual identification, but when adjustment parameters are read in step S13, information on the model or the like indicating the type of the apparatus in the apparatus ID is used.

Figure 9:
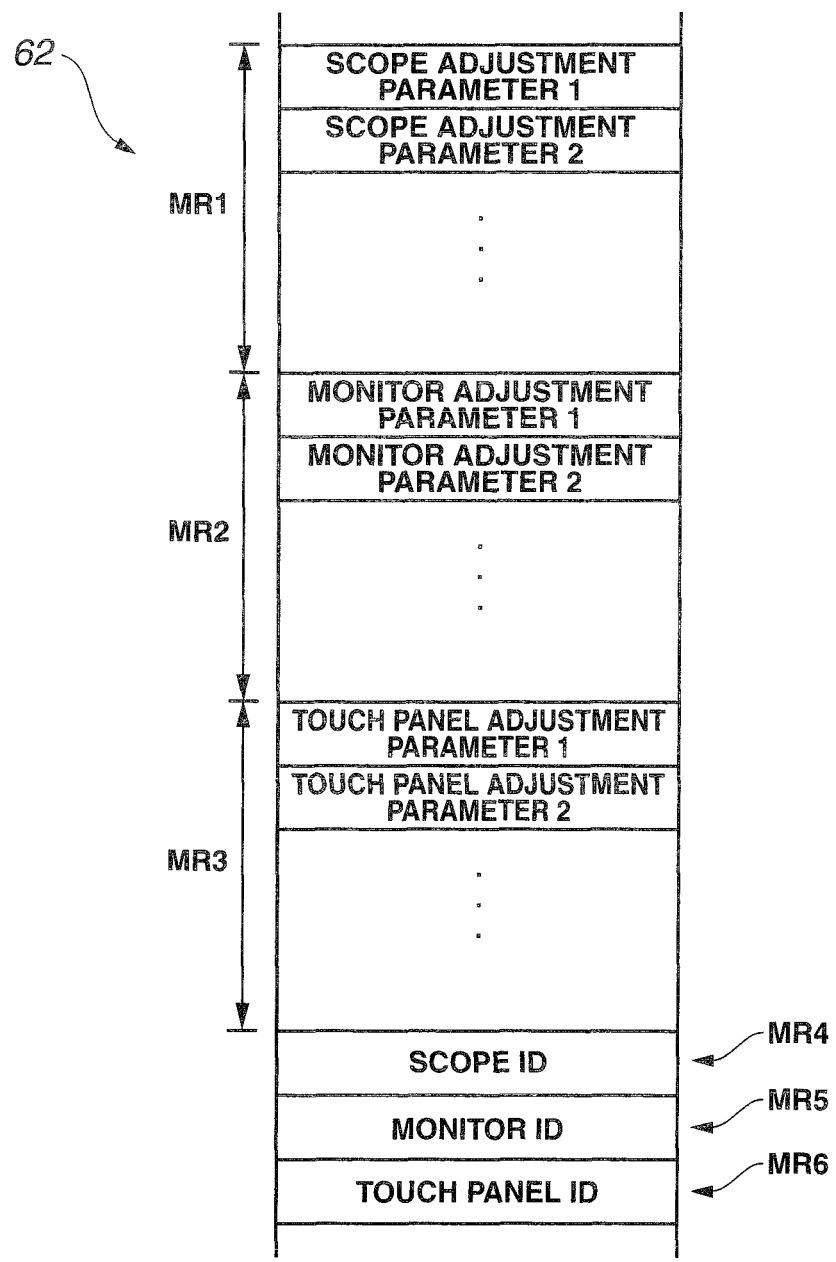
FIG. 9 is a diagram illustrating an example of memory map of various adjustment parameters and apparatus IDs stored in a RAM 62 according to the embodiment of the present invention.

FIG. 9 is a diagram illustrating an example of memory map of various adjustment parameters and apparatus IDs stored in the RAM 62.

As shown in FIG. 9, the RAM 62 includes a storage region MR1 that stores adjustment parameters on the scope unit 3, a storage region MR2 that stores adjustment parameters on the LCD 4, a storage region MR3 that stores adjustment parameters on the touch panel 34 and storage regions MR4, MR5 and MR6 that store a scope ID, a monitor ID and a touch panel ID.

Various adjustment parameters related to the LCD 4 and the apparatus ID2 are stored in the storage regions MR2 and MR5 of the RAM 62.

Data of various parameters stored in the RAM 62 are stored as data of corresponding adjustment parameters of the flash memory 63 (step S16). When once set various adjustment parameters are changed through the adjustment processing (step S15) of the processing in FIG. 7, the data of the table data 82 is updated. The ID data of the LCD 4 stored in the RAM 62 is also stored in a predetermined storage region of the flash memory 63 in step S16.

Next, the setting processing of the adjustment parameters in FIG. 7 is performed on the scope unit 3, and as shown in FIG. 9, adjustment parameters and apparatus ID1 are stored in the storage regions MR1 and MR4 of the RAM 62 respectively and stored or updated as adjustment parameters of the corresponding scope type of the table data 81 of the flash memory 63.

The adjuster can also determine whether or not the setting of adjustment parameters on the scope unit 3 is appropriate by observing an image displayed on the LCD 4.

Furthermore, the adjustment parameter setting processing in FIG. 7 on the touch panel 34 is performed, the adjustment parameters and apparatus ID3 are thereby stored in the storage regions MR3 and MR6 of the RAM 62 respectively as shown in FIG. 9 and stored or updated as adjustment parameters of the corresponding touch panel of the table data 83 of the flash memory 63.

As described above, the processing in aforementioned step S14 performed on the camera 31 constitutes a parameter setting section provided in the semiconductor device 22 that sets parameter data for adjusting at least one of the output timing of the drive signal of the drive circuit 71a and input timing of an input signal of the image signal from the camera 31. Likewise, the processing in aforementioned step S14 performed on the touch panel 34 constitutes a parameter setting section provided in the semiconductor device 22 that sets parameter data for adjusting at least one of the output timing of the drive signal of the drive circuit 71c and the input timing of an input signal from the touch panel 34.

In the aforementioned example, each adjustment parameter as an initial value stored in the flash memory 63 is rewritten through the setting processing during manufacture, but the table data 81 to 83 in FIG. 4 to FIG. 6 may be stored as initial values and adjustment parameters confirmed by the setting may be stored in the flash memory 63 apart from the initial values.

4.2 Parameter Setting When Power is ON

The endoscope apparatus 1 is adjusted correctly through the processing in FIG. 7 during manufacture and the adjustment parameters at the time of adjustment are stored in the flash memory 63. When the endoscope apparatus 1 is actually used on the site, the power is turned ON and the endoscope apparatus 1 is started.

In an industrial endoscope apparatus, the LCD 4 and the touch panel 34 attached to the main body 2 are seldom replaced under normal conditions on the site, but the scope unit 3 is relatively often replaced. In such a case, the user can set parameters of the scope unit 3 using the LCD 4 or touch panel 34.

When the LCD 4 is replaced, the user can also set parameters of the LCD 4 using the touch panel 34. When replacing the touch panel 34, the user connects a PC or the like to the main body 2 as described above and can set parameters of the touch panel 34 using the screen of the PC or the like.

Figure 10:
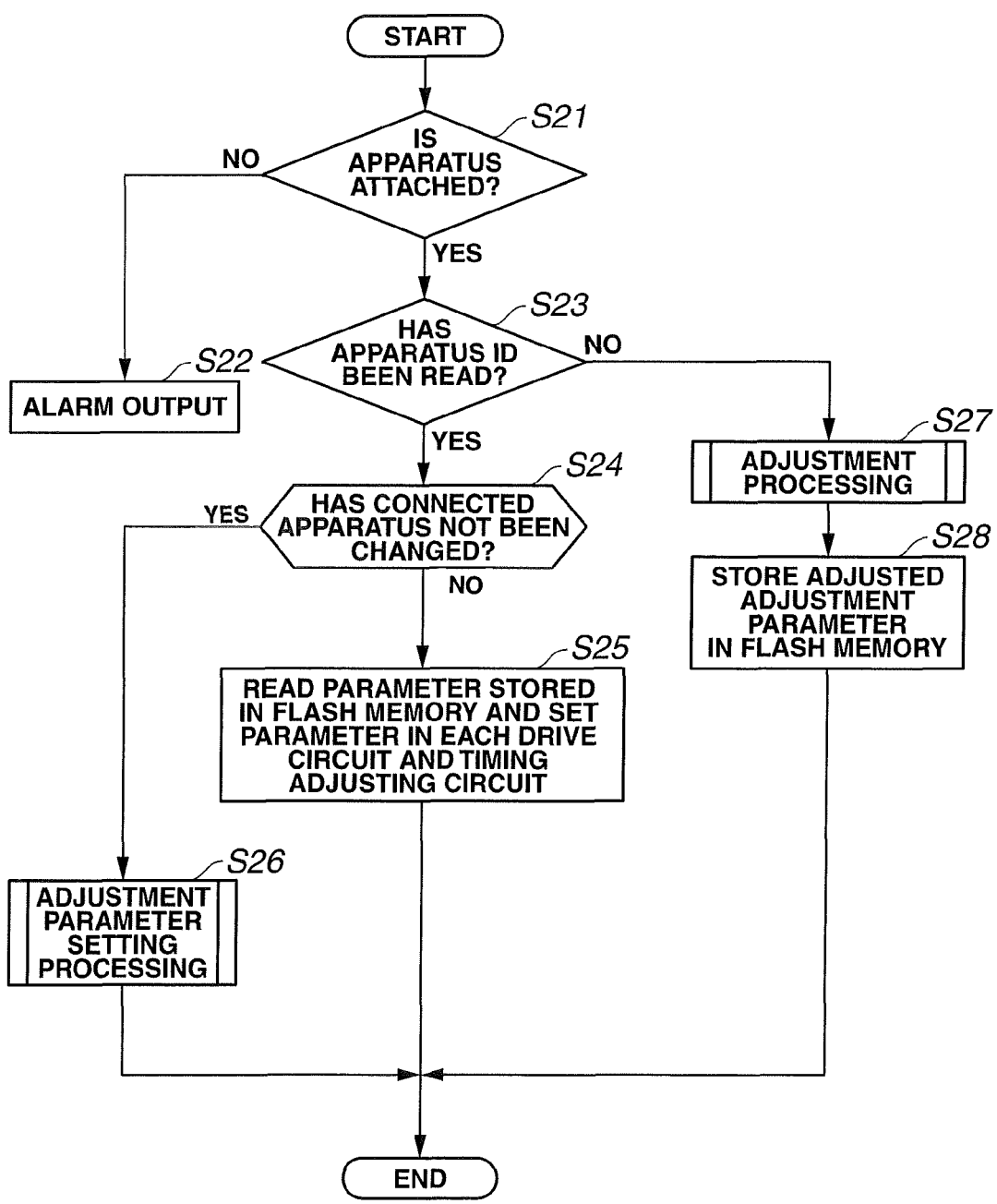
FIG. 10 is a flowchart illustrating a flow example of adjustment parameter setting processing when the endoscope apparatus 1 is ON according to the embodiment of the present invention.

FIG. 10 is a flowchart illustrating a flow example of adjustment parameter setting processing when the endoscope apparatus 1 is ON. The processing in FIG. 10 is executed for each connected apparatus.

When the power to the main body 12 is turned ON, the CPU core 61 executes the adjustment parameter setting processing program in FIG. 10.

First, the CPU core 61 determines whether or not the apparatus (first, the LCD 4) is connected or attached to the main body 2 (step S21). When the apparatus is not attached, step S21 results in "NO" and the CPU core 61 outputs a predetermined alarm (step S22). Examples of the predetermined output include display output to the LCD 4 or touch panel 34, voice output and beep tone output or the like.

When the apparatus is connected, step S21 results in "YES" and the CPU core 61 determines whether or not the ID of the connected apparatus has been read (step S23).

When the ID of the apparatus has been read, step S23 results in "YES", the CPU core 61 reads the apparatus ID2 of the connected apparatus, the LCD 4 here, compares the apparatus ID2 with the apparatus ID stored in the storage region MR5 of the flash memory 63 and thereby determines whether or not the connected apparatus has been changed. Comparisons are made not only in the type information of apparatus ID but also including unique individual identification information such as manufacturing number.

When there is no change in the connected apparatus, step S24 results in "NO," various adjustment parameters corresponding to the type of the connected apparatus are read from the flash memory 63 and set in the drive circuit 71b and the timing adjusting circuit 72b (step S25). The setting is made by the CPU core 61 writing the various adjustment parameters read from the flash memory 63 in the RAM 62 and further writing the various adjustment parameters in the registers 73b and 74b. The processing in step S25 constitutes a parameter setting section provided in the semiconductor device 22 that sets parameter data for adjusting at least one of output timing of a drive signal or input timing of an input signal of the drive circuit 71b.

Furthermore, when there is a change in the connected apparatus, step S24 results "YES" and the CPU core 61 executes the adjustment parameter setting processing program in FIG. 7 (step S26). In this case, since this is a setting of parameters of the LCD 4, the adjustment parameter setting processing of the LCD 4 is performed. When the touch panel 34 is available, the adjustment parameters can be set using the touch panel 34. Through the adjustment parameter setting processing program, the screen as shown in FIG. 8 is displayed on the touch panel 34 and the user can set the adjustment parameters using the screen.

Furthermore, when the apparatus ID, that is, the ID of the identification section 4a of the LCD 4 cannot be read, step S23 results in "NO" and the CPU core 61 executes adjustment processing (step S27). This step S27 is processing similar to that in step S15 in FIG. 7.

The CPU core 61 stores the data of various adjustment parameters stored in the RAM 62 as data of corresponding adjustment parameters of the flash memory 63 (step S28). This step S27 is processing similar to that in step S16 in FIG. 7.

As described above, adjustment parameters of the LCD 4 are set first and then the processing in FIG. 10 on the scope unit 3 and touch panel 34 is also performed.

As a result, for the LCD 4, scope unit 3 and touch panel 34, appropriate adjustment parameters are set in each drive circuit and each timing adjusting circuit.

As described so far, according to the present embodiment, it is possible to provide an endoscope apparatus that can easily adjust circuits in the apparatus. In the aforementioned example in particular, since each adjustment parameter is set by software, a circuit adjustment in the endoscope apparatus is easy.

Furthermore, since the endoscope apparatus of the aforementioned present embodiment incorporates the drive circuit and the timing adjusting circuit for each apparatus in the semiconductor device, the configuration in which the semiconductor device incorporates the drive circuit and the timing adjusting circuit for each apparatus is also preferable from the standpoint of EMC measures.

In the aforementioned example, the drive circuits and the timing adjusting circuits are shown as different circuits as the drive circuits 71a, 71b and 71c and the timing adjusting circuits 72a, 72b and 72c, but there may be a case where it is possible to adjust output timing of the drive signal OUT together by adjusting the drive circuit, and in such a case, part or the whole of the timing adjusting circuit is included in the drive circuit.

As described so far, according to the aforementioned present embodiment, it is possible to easily realize an endoscope apparatus in a simple configuration that can easily perform a circuit adjustment even when an image pickup device with a high number of pixels is used.

The present invention is not limited to the aforementioned embodiment, but various changes and modifications or the like can be made without departing from the spirit and scope of the present invention.

What is claimed is:

1. An endoscope apparatus that picks up an image of an object using an image pickup device, comprising:
a main body to which a plurality of insertion portions are allowed to be connected;
a semiconductor device mounted on a circuit substrate provided to the main body, and having a CPU and a first drive circuit for driving the image pickup device; and
a nonvolatile memory that is provided in the semiconductor device and stores a first program for setting first parameter data for adjusting a first output timing of a drive signal of the first drive circuit, the first output timing being different for each of the insertion portions,
wherein the CPU reads the first program for setting the first parameter data from the nonvolatile memory and executes the read first program, to thereby set the first parameter data in the first drive circuit.

2. The endoscope apparatus according to claim 1, further comprising:
a second drive circuit provided in the semiconductor device for driving a display section that displays the image of the object;
wherein the nonvolatile memory further stores a second program for setting second parameter data for adjusting a second output timing of a drive signal of the second drive circuit; and
wherein the CPU further reads the second program for setting the second parameter data from the nonvolatile memory and executes the read second program, to thereby set the second parameter data in the second drive circuit.

3. The endoscope apparatus according to claim 1, further comprising:
a third drive circuit provided in the semiconductor device for operating an endoscope system;
wherein the nonvolatile memory further stores a third program for setting third parameter data for adjusting a third output timing of a drive signal of the third drive circuit; and
wherein the CPU further reads the third program for setting the third parameter data from the nonvolatile memory and executes the read third program, to thereby set the third parameter data in the third drive circuit.

4. The endoscope apparatus according to claim 1, wherein the nonvolatile memory stores the first parameter data.

5. The endoscope apparatus according to claim 4, wherein when the endoscope apparatus is started, the CPU reads the first parameter data from the nonvolatile memory and makes the setting.

6. The endoscope apparatus according to claim 1, further comprising a first register provided in the semiconductor device for storing the first parameter data.

7. The endoscope apparatus according to claim 6, wherein the first output timing is adjusted by the CPU setting the first parameter data in the first register.

8. The endoscope apparatus according to claim 1, wherein the semiconductor device is a one-chip IC.

9. An endoscope apparatus that picks up an image of an object using an image pickup device provided at a distal end portion of an insertion portion of the endoscope, comprising:
a main body to which a plurality of insertion portions are allowed to be connected;
a semiconductor device made up of a one-chip IC mounted on a circuit substrate provided to the main body, and having a CPU and a first drive circuit for driving the image pickup device; and
a nonvolatile memory that is provided in the semiconductor device and stores a first program for setting first parameter data for adjusting a first output timing of a drive signal of the first drive circuit, the first output timing being different for each of the insertion portions,
wherein the CPU reads the first program for setting the first parameter data from the nonvolatile memory and executes the read first program, to thereby set the first parameter data in the first drive circuit.

10. The endoscope apparatus according to claim 9, further comprising:
a second drive circuit provided in the semiconductor device for driving a display section that displays the image of the object wherein the nonvolatile memory further stores a second program for setting second parameter data for adjusting a second output timing of a drive signal of the second drive circuit; and wherein the CPU further reads the second program for setting the second parameter data from the nonvolatile memory and executes the read second program, to thereby set the second parameter data in the second drive circuit.

11. The endoscope apparatus according to claim 10, wherein the nonvolatile memory stores the second parameter data, and when the endoscope apparatus is started, the CPU reads the second parameter data from the nonvolatile memory and makes the setting.

12. The endoscope apparatus according to claim 11, further comprising a second register provided in the semiconductor device that stores the second parameter data, wherein the second output timing is adjusted by the CPU setting the second parameter data in the second register.

13. The endoscope apparatus according to claim 9, further comprising:

a third drive circuit provided in the semiconductor device for operating an endoscope system;

wherein the nonvolatile memory further stores a third program for setting third parameter data for adjusting a third output timing of a drive signal of the third drive circuit; and wherein the CPU further reads the third program for setting the third parameter data from the nonvolatile memory and executes the read third program, to thereby set the third parameter data in the third drive circuit.

14. The endoscope apparatus according to claim 13, wherein the nonvolatile memory stores the third parameter data, and when the endoscope apparatus is started, the CPU reads the third parameter data from the nonvolatile memory and makes the setting.

15. The endoscope apparatus according to claim 14, further comprising a third register provided in the semiconductor device that stores the third parameter data, wherein the third output timing is adjusted by the CPU setting the third parameter data in the third register.

16. The endoscope apparatus according to claim 9, wherein the nonvolatile memory stores the first parameter data, and wherein when the endoscope apparatus is started, the CPU reads the first parameter data from the nonvolatile memory and makes the setting.

17. The endoscope apparatus according to claim 16, further comprising a first register provided in the semiconductor device that stores the first parameter data, wherein the first output timing is adjusted by the CPU setting the first parameter data in the first register.

* * * * *